March 12, 1968 J. CHASS 3,372,580
FORCE TRANSDUCER
Filed May 27, 1965
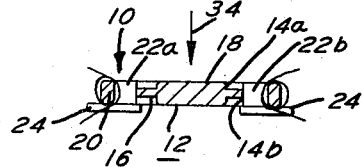
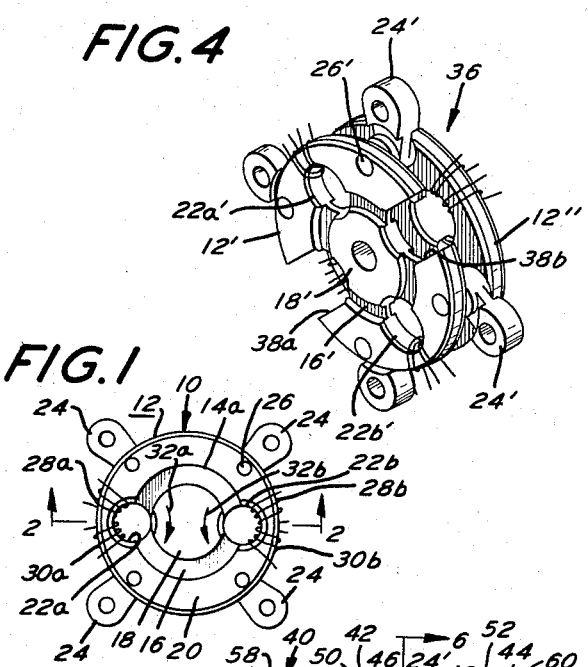
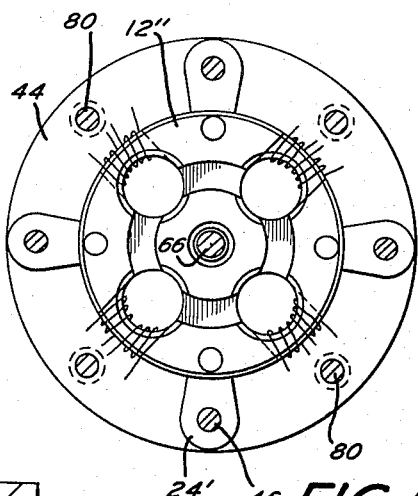
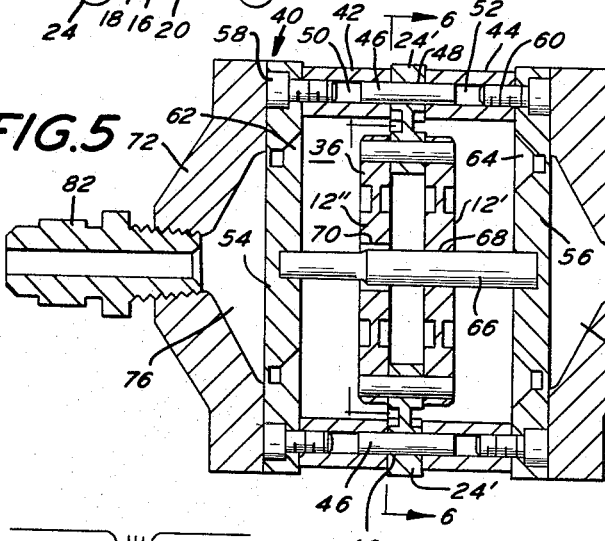
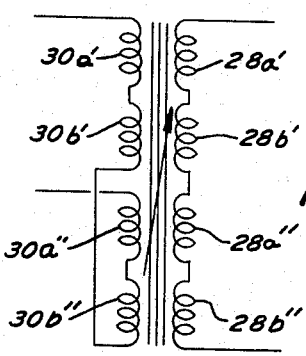
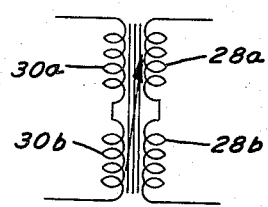
INVENTOR.
JACOB CHASS
BY
ATTORNEY

UNITED STATES PATENT OFFICE 3,372,580
Patented Mar. 12, 1968

3,372,580
FORCE TRANSDUCER
Jacob Chass, Philadelphia, Pa., assignor, by mesne assignments, to Robinson-Halpern Company, West Conshohocken, Pa., a corporation of Pennsylvania
Filed May 27, 1965, Ser. No. 459,163
14 Claims. (Cl. 73—141)

The present invention relates to a force transducer, and more particularly to a transducer for converting a physical force to an electrical signal for the purpose of measuring the physical force.

In measuring many types of forces or variations in force, transducers are used which convert the force to an electrical signal. The forces being measured can be those created by the pressure of a weight or the pressure or difference in pressures of a fluid or gas. It is often desirable for such transducers to be capable of accurately measuring small variations in the force or small differences in pressure when measuring pressure differentials. Also, the transducer should have no moving parts which can become worn or broken so that the device will have a long, usable life. In addition, the transducer should be unaffected by environmental forces, such as shock, vibration, and changes in atmospheric pressure, so that the electrical output signal of the device is an indication of only the force being measured.

It is an object of the present invention to provide a novel force transducer.

It is another object of the present invention to provide a novel force transducer in which the force being measured causes a variation in the electrical permeability of the core of a transformer to provide an electrical signal corresponding to the force.

It is a further object of the present invention to provide a force transducer which can accurately measure small forces or variations in force.

It is a still further object of the present invention to provide a force transducer which has no moving parts and which is unaffected by environmental forces.

Other objects will appear hereinafter.

For the purpose of illustrating the invention, there is shown in the drawings forms which are presently preferred; it being understood, however, that this invention is not limited to the precise arrangements and instrumentalities shown.

FIGURE 1 is a top plane view of the transducer of the present invention.

FIGURE 2 is a sectional view taken along line 2—2 of FIGURE 1.

FIGURE 3 is an electrical circuit diagram of the transducer shown in FIGURES 1 and 2.

FIGURE 4 is a perspective view of a modification of the transducer of the present invention.

FIGURE 5 is a sectional view of a differential pressure transducer using the transducer of the present invention shown in FIGURE 4.

FIGURE 6 is a sectional view along the planes of broken line 6—6 of FIGURE 5.

FIGURE 7 is an electrical circuit diagram of the transducer shown in FIGURE 4.

Referring initially to FIGURES 1 and 2, the transducer of the present invention is generally designated as 10.

Transducer 10 comprises a disc 12 of a magnetic material, the permeability of which will vary when the material is stressed, such as the permalloys. The disc 12 has a pair of opposed, annular grooves 14a and 14b in its opposed surfaces. This provides a thin, annular web portion 16 which is connected between a circular central portion 18 and an annular outer portion 20. Disc 12 has two holes 22a and 22b therethrough. The holes 22a and 22b are positioned at diametrically opposite sides of the central portion 18 and extend across the web portion 16. Four mounting arms 24 are secured to the outer portion 20 of the disc 12 by pins 26. The arms 24 are uniformly spaced around the disc 12 and project radially outwardly from the disc.

Separate primary coils 28a and 28b are wound around the outer portion 20 of the disc 12 through each of the holes 22a and 22b respectively.

Separate secondary coils 30a and 30b are likewise wound around the outer portion 20 of the disc 12 through each of the holes 22a and 22b respectively. Although the primary coils 28a and 28b are shown as being in side-by-side relation to their respective secondary coils 30a and 30b, one of the coils wound through each of the holes can surround the other coil. As shown in FIGURE 3, the primary coils 28a and 28b are connected in series aiding relation, and the secondary coils 30a and 30b are also connected in series aiding relation.

In the use of the transducer 10, the disc 12 is rigidly supported at its outer edge by means of the mounting arms 24. The primary coils 28a and 28b are connected across a source of A.C. current. The current through the primary coils 28a and 28b creates a magnetic flux which extends in a circular path around each of the holes 22a and 22b is indicated by the arrows 32a and 32b. Since the holes 22a and 22b extend across the web portion 16 of the disc 12, the magnetic flux paths pass through the web portion. The magnetic flux paths also pass through the secondary windings 30a and 30b to induce a current in each of the secondary windings. The voltage of the reduced current across the secondary coils 30a and 30b is proportional to the voltage across the primary windings and the permeability of the disc 12.

The force to be measured is applied to the central portion 18 of the disc 12 as indicated by the arrow 34 in FIGURE 2. This force causes a stressing of the thinner web portion 16 of the disc 12. As previously stated, the disc 12 is made of a material the permeability of which will vary when the material is stressed. Thus, stressing the web portion 16 of the disc 12 changes the permeability of the web portion. This changes the flux density in the flux paths around each of the holes 22a and 22b and thereby changes the voltage of the induced current across each of the secondary coils 30a and 30b. Thus, the change in the voltages induced across the secondary coils 30a and 30b is a function of the force applied to the transducer 10 so as to provide an indication of the magnitude of the applied force. Although the transducer 10 is shown to have two holes therethrough with two primary coils and two secondary coils, the transducer will function in the same manner with only one hole and one set of windings. By having the two sets of windings, a larger output voltage is achieved which is easier to measure.

Referring to FIGURE 4, a modification of the transducer of the present invention is generally designated as 36.

Transducer 36 comprises two discs 12' and 12" each of which is substantially identical in construction to that of the disc 12 shown in FIGURES 1 and 2. However, disc 12' has a pair of notches 38a and 38b in its outer edge which extend radially inward across the web portion 16' to the central portion 18' of the disc. The notches 38a and 38b are diametrically opposite each other and are intermediate the holes 22a' and 22b' in the disc 12'. The width of the notches 38a and 38b is equal to the diameter of the holes 22a' and 22b'. The disc 12" also has a pair of the notches, not shown. The discs 12' and 12" are secured together in spaced relation on opposite sides of the mounting arms 24' by pins 26'. The discs 12' and 12" are positioned with respect to each other so that the notches 38a and 38b in the disc 12' are directly opposite the holes in the disc 12", and the holes 22a' and 22b' in the disc 12' are directly opposite the grooves in the disc 12". This arrangement of the notches and holes permits the various primary and secondary coils to be easily wound on the discs 12' and 12" through the holes after the discs 12' and 12" are connected together.

As shown in FIGURE 7, the primary coils 28a' and 28b' on the disc 12' and the primary coils 28a" and 28b" on the disc 12" are all electrically connected in series aiding relation. The secondary coils 30a' and 30b' of the disc 12' are electrically connected together in series aiding relation, and the secondary coils 30a" and 30b" on the disc 12" are electrically connected together in series aiding relation. However, the secondary coils 30a' and 30b' of the disc 12' are electrically connected to the secondary coils 30a" and 30b" of the disc 12" in series bucking relation. Thus, when the voltages induced across the two sets of secondary coils are of equal magnitude, they will balance each other so that the electrical output of the transducer 36 is zero. However, it should be understood that the same result can be achieved by connecting the two sets of secondary coils in series aiding relation and the two sets of primary coils in series bucking relation.

In the use of the transducer 36, the transducer is rigidly supported by the mounting arms 24', and the primary coils 28a', 28b', 28a" and 28b" are connected across a source of A.C. current. As stated with regard to the transducer 10 of FIGURES 1 and 2, the current through the primary coils induces a voltage across the secondary coils 30a', 30b', 30a" and 30b". The primary and secondary coils are wound so that when no force is being applied to the transducer 36, the voltage induced across the secondary coils 30a' and 30b' is equal to the voltage induced across the secondary coils 30a" and 30b". Thus, as stated above, the voltages induced across the two sets of secondary coils balance each other so that the electrical output of the transducer 36 is substantially zero.

The force to be measured is applied to the central portion of only one of the discs, for example, the disc 12'. The force applied to the disc 12' causes a stressing of the web portion 16' of the disc 12' and thereby changes the permeability of the web portion 16". This varies the voltage induced across the secondary coils 30a' and 30b'. Since the voltages now induced across the two sets of secondary coils are of different magnitude, an output signal is obtained across the secondary coils of the transducer 36 which is equal to the difference between the voltages induced across the two sets of secondary coils. This output signal of the transducer 36 provides a direct indication of the magnitude of the force being measured.

The double disc transducer 36 of FIGURE 4 has the advantage over the single disc transducer 10 of FIGURES 1 and 2 in that the transducer 36 has a null point, substantially zero output, when no force is applied and the output signal of the transducer 36 is a direct indication of the magnitude of the force being measured, whereas, with the transducer 10, a difference in two output signals is required to provide an indication of the magnitude of the force being measured. Another advantage of the transducer 36 is that its output signal is not affected by any environmental forces. If the transducer 36 is subjected to an environmental force, such as shock or vibration, both of the discs 12' and 12" would be subjected equally to the force. Thus, if the force applied a stress to the web portion 16' of the disc 12', the web portion of the disc 12" would be equally stressed. Therefore, the permeability of the web portions of the discs 12' and 12" would be varied equally and the voltages induced across both sets of the secondary coils would be changed by equal amounts. Since the two sets of secondary coils are connected in series bucking relation, the equal changes in the voltage across the two sets of the secondary coils will balance each other out so that the small output of the transducer 36 will remain unchanged. Therefore, the output of the transducer 36 is unaffected by environmental forces and will always indicate only the force being measured.

Referring to FIGURES 5 and 6, there is shown a differential pressure transducer, generally designated as 40, utilizing the transducer element 36 of FIGURE 4. Differential pressure transducer 40 comprises a pair of cylindrical rings 42 and 44 mounted on opposite sides of the mounting arms 24' of the transducer element 36. The inner diameter of the cylindrical rings 42 and 44 is larger than the diameter of the discs 12' and 12" so that the discs fit within the rings. Pins 46 extend through holes 48 in the outer ends of the mounting arms 24' and into holes 50 and 52 in the cylindrical rings 42 and 44 respectively to support the transducer element 36 within the cylindrical rings.

A pair of flat, metal diaphragm plates 54 and 56 extend across the outer ends of the cylindrical rings 42 and 44 respectively. The diaphragm plates 54 and 56 are secured to the rings 42 and 44 respectively by screws 58 and 60 which extend through the diaphragm plates and are threaded into the holes 50 and 52. The opposing surfaces of the diaphragm plates 54 and 56 are provided with annular grooves 62 and 64 respectively. The grooves 62 and 64 form thin web sections which permit flexing of the center portions of the diaphragm plates 54 and 56. A shaft 66 extends between and is secured to the diaphragm plates 54 and 56 at the center of the diaphragm plates. Shaft 66 extends through holes 68 and 70 in the center of the discs 12' and 12" respectively of the transducer element 36. The shaft 66 has a tight fit in the hole 68 of the disc 12' so that the center portion of the disc 12' will move with the shaft. The hole 70 in the disc 12" is larger than the shaft 66 so that the shaft can move freely through the hole 70.

Cone shaped cover plates 72 and 74 extend across the outer surfaces of the diaphragm plates 54 and 56 respectively and form chambers 76 and 78 between the diaphragm plates and the cover plates. Bolts 80 (see FIGURE 6) extend through the cover plates 72 and 74, diaphragm plates 54 and 56 and cylindrical rings 42 and 44 between the mounting arms 24' of the transducer element 36 to secure the parts of the transducer 40 together. Inlet fittings 82 and 84 are threaded into holes in the apices of the cover plates 72 and 74 respectively.

In the use of the transducer 40, the primary coils of the transducer element 36 are connected to a source of A.C. current so as to induce voltages across the secondary coils in the manner previously described. The inlet fittings 82 and 84 are connected to two different sources of pressure to be measured, one of which sources can be the atmosphere. When the pressures within the chambers 76 and 78 are equal, the diaphgram plates 54 and 56 remain flat so that the disc 12' of the transducer element 36 is unstressed and the output of the transducer is zero. If one of the pressures is greater than the other, the diaphgram plates 54, 56 are stressed toward the chamber which is under the lower pressure. This stress is applied to the disc 12' through the shaft 66 so as to produce an output signal from the transducer in the manner as previously described. Thus, the transducer 40 can be used to measure the gage pressure of a single series of pressures, or can be used to measure the difference in pressure between two sources of pressures.

The present invention may be embodied in other specific forms without departing from the spirit or essential attributes thereof, and, accordingly, reference should be made to the appended claims, rather than to the foregoing specification as indicating the scope of the invention.

I claim:

1. A transducer comprising a pair of discs of a magnetical material the permeability of which varies when the material is stressed, each of said discs having a central portion, an outer portion surrounding and spaced from said central portion and a web portion connecting the central portion and the outer portion, said web portion being thinner than the central portion and the outer portion, the outer portion of each of said discs having a hole therethrough, the edge of the hole extending at least to the web portion of the disc, a separate primary coil wound through the hole and around the outer portion of each of said discs, a separate secondary coil wound through the hole and around the outer portion of each of said discs, and means securing the discs together in spaced parallel relation only at the outer portion of the discs including means for rigidly supporting the discs at the outer edges thereof, and means for applying a force to be measured to the central portion of only one of said discs, the primary coils of said discs being electrically connected together, the secondary coils of said discs being electrically connected together, the connection between said coils being such that, when the primary coils are connected to an A.C. current, the voltages induced across the secondary coil of one of said discs is in bucking relation to the voltage induced across the secondary coil of the other disc, whereby the application of said force causes a stressing and change in the permeability of the web portion of said one disc which, by altering the flux of the flux path around the hole produces a change in the voltage induced in the secondary coil of said one disc.

2. A transducer in accordance with claim 1 in which the holes in the discs are in non-opposing relation and the outer portion of each of said discs has a notch in its outer edge extending radially inwardly at least to the web portion of the disc, the notch in each of said discs being in opposing relation to the hole in the other disc.

3. A transducer in accordance with claim 1 in which the outer portion of each of said discs has a second hole therethrough spaced from the first hole, the edge of said second hole in each of said discs extending at least to the web portion of the disc, a separate secondary primary coil wound through the second hole in each of said discs and around the outer portion of the disc, and a separate secondary coil wound through each of said second holes and around the outer portion of the disc, the two primary coils on each of said discs being connected in series aiding relation and the two secondary coils on each of said discs being connected in series aiding relation.

4. A transducer in accordance with claim 3 in which the holes in the discs are in non-opposing relation, and the outer portion of each of the discs has a pair of notches in its outer edge extending radially inwardly at least to the web portion of the disc, each of the notches in each of said discs being in opposing relation to a separate one of the holes in the other disc.

5. A transducer in accordance with claim 4 in which the holes in the outer portion of each of the discs are positioned at opposite sides of the central portion along a line extending across the center of the disc, and the notches are between the holes.

6. In a transducer comprising:
   a member of magnetic material the permeability of which varies when the material is stressed;
   means for applying stress forces to said member; and
   means forming a closed flux path in said member about an axis therethrough including means for producing flux in said path and for detecting flux changes therein:
   the improvement of:
   said member having spaced portions, and means connecting said portions, said spaced portions and connecting means extending transversely to said axis,
   said force applying means including means for applying to one of said spaced portions forces generally parallel to said axis to produce stresses in said member, and for retaining the other thereof to apply an oppositely directed force thereto, said connecting means including means weaker than said spaced portions in the direction of said forces for substantially concentrating bending stresses produced thereby,
said flux path forming means further including aperture means for limiting all of the flux in said flux path to passage through said stress concentrating means, said aperture means passing through said member generally parallel to said axis;
whereby the application of said forces causes stressing in said stress concentrating means and variation in the permeability thereof to change the flux in said flux path for detection by said detecting means.

7. A transducer as recited in claim 6, wherein said aperture means passes through said stress concentrating means and extends thereacross between said spaced portions.

8. A transducer as recited in claim 7, wherein said member has a plurality of outer ones and an inner one of said spaced portions, and said connecting means having separate stress concentrating means between each of said outer portions and said inner portion, with said outer portions positioned on different sides of said inner portion; said flux path means includes means for producing separate flux paths for each of said stress concentrating means, and said aperture means includes separate spaced apertures through each of said stress concentrating means and extending between said inner portion and the associated outer portion.

9. A transducer as recited in claim 8, wherein said outer spaced portions are positioned on diametrically opposite sides of said inner portion, and said force applying means includes means for applying the same forces to said outer portions.

10. A transducer as recited in claim 9, wherein said flux producing and flux change detecting means of each of said flux path means include means for producing signals in accordance with the detected flux changes and for combining said signals in aiding relation.

11. A transducer as recited in claim 6, wherein said aperture means passes through one of said spaced portions and extends at least to said stress concentrating means, and said detecting means includes winding means about said one spaced portion.

12. A transducer as recited in claim 11, wherein said aperture means further passes through said stress concentrating means and extends thereacross to said other spaced portion.

13. A transducer as recited in claim 6, and further comprising a second one of said members; said flux path means includes means forming flux paths in each of said members, said detecting means includes means for producing signals in accordance with the flux changes in each of said flux paths and for combining said signals in opposing relation; and said force producing means includes means for applying similar forces to one of said spaced portions of both of said members, and means for applying a force to be measured to the other spaced portion of only the first mentioned one of said members.

14. A transducer as recited in claim 6, wherein said stress concentrating means includes a connecting web thinner than said spaced portions in the direction of said forces.

References Cited
UNITED STATES PATENTS 3,033,031    5/1962    Gruber    73—140
3,258,962    7/1966    Dahle    73—133

RICHARD C. QUEISSER, *Primary Examiner.*

J. GILL, *Examiner.*

J. D. SCHNEIDER, *Assistant Examiner.*